United States Patent Office 3,385,179
Patented May 28, 1968

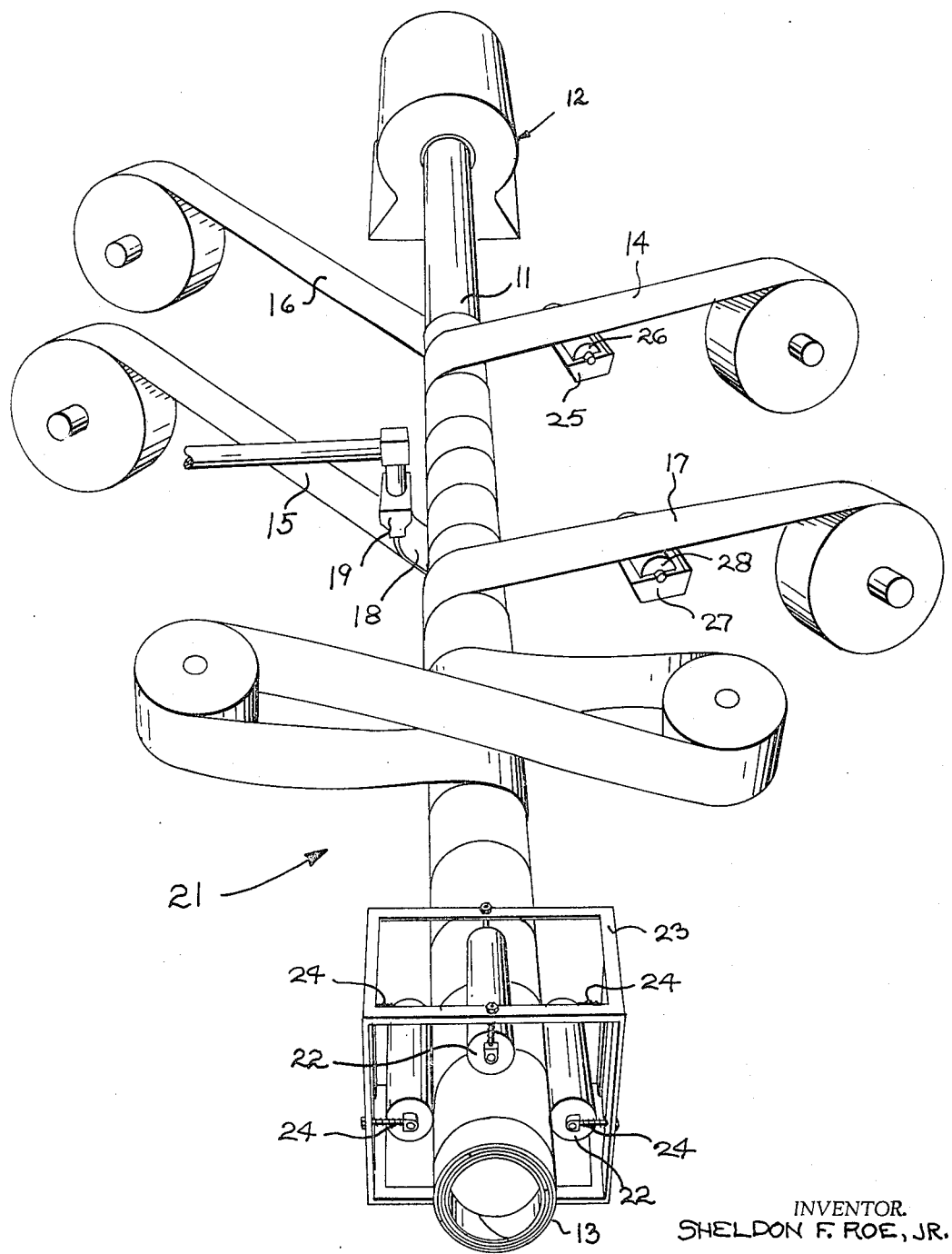

3,385,179
CYLINDRICAL ARTICLE AND METHOD
AND APPARATUS FOR THE PRODUC-
TION THEREOF
Sheldon F. Roe, Jr., Toledo, Ohio, assignor to Owens-
Illinois, Inc., a corporation of Ohio
Filed June 1, 1965, Ser. No. 460,018
8 Claims. (Cl. 93—94)

ABSTRACT OF THE DISCLOSURE

This application discloses a method and apparatus for the production of a composite spirally-wound tube having first and second radially successive structural paper plies in which the structural plies are bonded to one another by a high molecular weight heat-softenable plastic material which is applied during the winding operation to one of the structural plies by extrusion at elevated temperature.

---

This invention relates to a cylindrical article of novel and advantageous construction comprising first and second plies of paper in radial succession and to a method and apparatus for the production thereof. More particularly, the invention relates to such an article wherein each of the plies of paper is bonded to a common layer of a thermoplastic or other heat-softenable plastic material, and thereby to one another, and to a method and apparatus for extruding a heated heat-softenable plastic material between plies of paper as they are being spirally wound about a common mandrel to effect bonding of the paper plies to one another by means of the plastic material.

In the production of a cylindrical article comprising a pair of structural plies of paper disposed in radial sequence adjacent to one another, which article may be utilized to advantage in the manufacture of containers, e.g., the so-called composite or fibre cans, it is common to bond the structural plies of paper to one another by means of a water-based adhesive, e.g., dextrine glue. Such a practice involves a difficult problem of mass transfer in the evaporation of solvent (moisture) from the adhesive through the plies of the article. This problem is further complicated when plies of a highly impervious substance, e.g., plies of paper laminated to aluminum foil, are wound on the interior and exterior of the structural plies in conjunction with the winding process, as is common practice.

It has been proposed that the problems involved in the evaporation of solvent from a solvent-based adhesive used in bonding the structural plies of such a cylindrical article can be overcome by the substitution of a heated "hot-melt" adhesive for such solvent-based adhesive. However, the use of presently available hot-melt adhesives introduces the risk that the bond will fail to the detriment of the strength of the article under the influence of heat. The exposure of the article to heat may be intentional as in the case of the pasteurization of foods packaged in containers manufactured from such articles.

In accordance with the present invention, therefore, it is proposed to bond a pair of radially adjacent plies of paper in a cylindrical article to one another by means of a layer of heat-softenable plastic material introduced between the plies at a temperature sufficiently high to form a suitable bond to each ply. Generally speaking, the plastic material is of a relatively high molecular weight requiring that it be so introduced, under present practices, by extrusion as by means of a screw-type plasticizer, i.e. a molecular weight of the order of at least 10,000. Such a bonding step may be accomplished in a conventional process for producing such article by means of a process for spirally winding strips of paper upon an elongate cylindrical mandrel by providing means for extruding the heated plastic material on a side of one of the strips of paper at a location sufficiently close to the location where that surface is brought into radially adjacent relationship to a surface of the other of the strips for the plastic material to have retained sufficient heat to bond to the second of the strips. Subsequently, the bonding of the plastic material to each of the strips of paper may be facilitated by applying radial compressive forces to the plies of the article so-formed.

The use of an extruded thermoplastic or other heat-softenable plastic material as an adhesive in the manner proposed is of advantage in that there is no solvent that need be thereafter evaporated and there is, nonetheless, provided a bond which will not fail despite its subsequent exposure to temperatures of the order of magnitude, for example, as the temperatures used in the pasteurization of food. Additionally, the use of such a plastic material as proposed serves as an improved vapor barrier to prevent the transfer of vapor to or from the product contained in a container manufactured from such articles and the use of plastic material in significant quantities can appreciably improve the strength of such containers.

For a further understanding of the invention, attention is directed to the following portion of the specification, the drawing, and the appended claims.

In the drawing:

FIG. 1 is a perspective view of apparatus in accordance with the present invention for producing a tubular article in accordance with the present invention by a method in accordance with the present invention.

In the practice of the present invention, there is provided a cylindrical forming mandrel 11 of substantial length mounted in overhanging fashion by means of bearing block 12. A tubular article 13 is formed on mandrel 11 by spirally winding a plurality of strips of material thereon in such a fashion that the convolutions of the various strips are disposed in radial succession to one another in the finished article. In accordance with the common practice, the plurality of strips comprise first and second strips 14 and 15 of a relatively sturdy grade of paper such as kraft paper which constitute the major structural plies or "body plies" of the finished article. Additionally, it is customary to incorporate plies of an impervious character on the interior and the exterior of the finished article which may be accomplished by winding a strip 16 comprising a laminate of aluminum foil and paper on mandrel 11 prior to the winding of strips 14 and 15 thereon and by winding a strip 17 which may also comprise an aluminum foil-paper laminate on the exterior of the winds of strip 15.

In the manufacture of article 13 in accordance with the foregoing technique, it is important that radially adjacent winds or convolutions of each of the succeeding strips of material be permanently bonded to one another. It is particularly important that the character of the bond between adjacent convolutions of strips 14 and 15 be of an optimum quality since article 13 derives its major structural characteristics from the plies formed by the convolutions of strips 14 and 15.

In accordance with the present invention, therefore, radially adjacent portions of the convolutions of strips 14 and 15 are bonded to one another by means of an initially high temperature heat-softenable plastic material 18 which is heated and extruded therebetween by extrusion means comprising extruder head 19. Extruder head 19 is so located with respect to the location where strip 15 is wound over the convolutions of strip 14 for plastic material 18 to have retained sufficient heat to effect bonding to one another. Plastic material 18 is extruded in a thin layer across one of the surfaces of strips 14 and 15 selected from the group consisting of the exterior surface of strip 14 and the interior surface of strip 16 and usually on the surface which faces upwardly at the location where the strips are brought together.

In the practice of the present invention, it is contemplated that many heat-softenable plastic materials will have sufficient adhesive properties at their extrusion temperature to warrant the consideration of a skilled artisan. Specifically, it is contemplated that the invention can be practiced by extruding a plastic material selected from the group consisting of polyolefins, styrenes, acrylonitrile-butadiene-styrene, acetals, nylons, polycarbonates, epoxy and polyvinyl chloride. The polyolefins, and specifically polyethylene, are apt to be preferred materials due to their relatively low cost and to the familiarity of prior artisans with their handling characteristics. The invention has been successfully practiced to date using medium and high density polyethylene. Low density polyethylene has not been found to be entirely suitable to date in view of the fact that it tends to soften at an unduly low temperature thus precluding its use in containers which must withstand subsequent heating.

The use of a foamable thermoplastic material in conjunction with foaming means is also contemplated. Such a technique would impart improved insulating and/or shock-resistant properties to the finished article.

Adhesion between the heated plastic material and the strips of paper has been found to have been improved by the subsequent application of compressive force normally to the plies of paper subsequent to the winding of the outer of the paper plies and preferably while the tubular article is on the mandrel so that the plastic material will be at an elevated temperature. Generally speaking, sufficient radial compressive force can be provided by the frictional drive belt system 21 which is customarily provided to advance the tubular article along the mandrel since some constrictive force is also provided by virtue of the fact that the strips of paper are under some tension as they are spirally wound. In some instances, however, it may be necessary to provide additional means for applying radial pressure against the outer surface of the articel on mandrel 11. In the illustrated embodiment, such means are shown as comprising a plurality of rollers 22 circumferentially spaced around mandrel 11 and mounted in a common framework 23. Each of the rollers 22 is rotatable in tangentially contacting relationship with spirally turning article 13 on mandrel 11 and each is resiliently biased toward mandrel 11, as by means of springs 24, counterweights, pneumatic or hydraulic cylinders, or the like. Rollers 22 may be disposed slightly askew with respect to the axis of mandrel 11 in a manner not shown for compatibility with the spiral advancement of article 13 and,, if so oriented, would be of a suitable contour for lineal engagement therewith.

The use of various other techniques for improving the adhesion characteristics between the thermoplastic material and the paper strips in contemplated in the practice of the present invention though such techniques do not constitute a part of the invention. Thus, it may be desirable to provide means such as radiant lamps to preheat the strips of paper prior to their contact with the thermoplastic material and/or it may be desirable to utilize chemical adhesion promoters, as by way of the usage of strips of paper coated with an adhesion promoter. Good results have been obtained in using coated linerboard marketed by Mead Corporation under the name "Adcote." Adhesion characteristics have also been found to be better between polyethylene and rough linerboard than between polyethylene and smoother linerboard.

The bonding of the inner liner convolutions of strip 16 to the convolutions of strip 14 and the bonding of the outer liner convolutions of strip 17 to the convolutions of strip 15 may also be accomplished by means of a heated extruded thermoplastic material. However, it appears likely that the added expense involved in effecting such bonding steps by means of a heated thermoplastic material will not ordinarily be justifiable since the quality of the bond between such convolutions does not contribute to as significant a degree to the strength and integrity of the finished article as does the quality of the bond between the convolutions of strips 14 and 15, the body plies of the article. Hence, in the illustrated embodiment, there is schematically shown glue applying means comprising a pan 25 and a roller applicator 26 for applying a conventional adhesive to strip 14 to effect bonding between the convolutions of strips 14 and 16. Likewise, there is provided similar means comprising pan 27 and roller applicator 28 for applying adhesive to strip 17 to effect bonding between the convolutions of strips 17 and 15.

It is believed that the best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and, it is, therefore, desired to limit the invention only in accordance with the appended claims.

I claim:

1. A method for production of a tubular article useful in the manufacture of bodies of cylindrical containers comprising the steps of: spirally winding a plurality of strips of thin flexible material on an elongate mandrel with the edges of adjacent convolutions of each strip disposed proximately to one another, the plurality of strips being in radial sequence when so wound and comprising first and second plies of paper disposed radially adjacent to one another; extruding a heated heat-softenable plastic material of a molecular weight of the order of at least 10,000, and having substantial adhesive properties at its extrusion temperature, between the first and second plies of paper at a location sufficiently close to the location where the exterior of the plies is wound over the interior of the plies for the plastic material to retain sufficient heat to bond the first and second plies to one another; applying radially inwardly directed pressure onto the exterior of the outer of said plies while said tubular article is still on the mandrel by means of a drive belt system which also axially advances the tubular article along the mandrel in a spiral path; and further applying a radially inwardly directed pressure onto the exterior of the outer of said plies by means of rollers circumferentially spaced along the mandrel each of which is rotatable with the tubular article on the mandrel and each of which is resiliently biased toward the mandrel.

2. The method of claim 1 wherein the heat-softenable plastic material consists substantially of a material selected from the group consisting of polyolefins, styrenes, acrylonitrile-butadiene-styrene, acetals, nylons, polycarbonates, epoxy, and polyvinyl chloride.

3. The method of claim 2 wherein the plastic material consists substantially of a polyolefin.

4. The method of claim 3 wherein the plastic material consists substantially of polyethylene.

5. The method of claim 1 wherein the plastic material is extruded onto a surface selected from the group consisting of the exterior surface of the interior ply and the interior surface of the exterior ply.

6. The method of claim 5 wherein the mandrel is generally horizontally oriented and wherein the plastic material is extruded onto that surface of the group which is an upwardly facing surface.

7. The method of claim 6 wherein the plastic material is extruded onto said surface in a thin film extending across said surface.

8. Apparatus for the production of a tubular article useful in the manufacture of bodies of cylindrical containers comprising, in combination: an elongated cylindrical mandrel; means for spirally winding a first strip of paper into a cylindrical form externally of the mandrel with the edges of adjacent convolutions being disposed proximately to one another; means for spirally winding a second strip of paper externally of the first strip with the edges of adjacent convolutions of the second strip being disposed proximately to one another; means for bonding radially adjacent convolutions of the first and second strip to one another comprising an extruder for extruding a heated heat-softenable plastic material between first an second convolutions at a location sufficiently close to the location where a convolution of the second strip is wound around a convolution of the first strip for the plastic material to retain sufficient heat to have adhesive properties sufficient to bond the first and second strips to one another; a frictional drive belt system for advancing the tubular article along the mandrel in a spiral path and for applying radial compressive force to said first strip, said second strip and said plastic material; and a plurality of rollers circumferentially spaced about the mandrel each of which is rotatable in tangentially contacting relationship with the tubular article on the mandrel and each of which is resiliently biased toward the mandrel.

References Cited
UNITED STATES PATENTS

| | | | |
|---|---|---|---|
| 3,018,212 | 1/1962 | Chinn | 93—80 |
| 3,033,707 | 5/1962 | Lacy et al. | 156—244 |
| 3,081,213 | 3/1963 | Chinn | 156—244 |
| 3,183,802 | 5/1965 | Rutledge | 93—80 |
| 3,230,135 | 1/1966 | Hurst | 156—244 |
| 3,296,945 | 1/1967 | Cvacho et al. | 93—80 |
| 3,317,363 | 5/1967 | Weber | 156—244 |

GERALD A. DOST, *Primary Examiner.*